US012598574B2

(12) United States Patent
Lataste et al.

(10) Patent No.: US 12,598,574 B2
(45) Date of Patent: Apr. 7, 2026

(54) METHOD FOR REGISTERING A USER TERMINAL WITH A NETWORK-SLICED COMMUNICATION NETWORK

(71) Applicant: ORANGE, Issy-les-Moulineaux (FR)

(72) Inventors: Sandrine Lataste, Châtillon Cedex (FR); Steve Tsang Kwong U, Châtillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 362 days.

(21) Appl. No.: 18/558,628

(22) PCT Filed: Apr. 27, 2022

(86) PCT No.: PCT/FR2022/050804
§ 371 (c)(1),
(2) Date: Nov. 2, 2023

(87) PCT Pub. No.: WO2022/234219
PCT Pub. Date: Nov. 10, 2022

(65) Prior Publication Data
US 2024/0236909 A1      Jul. 11, 2024

(30) Foreign Application Priority Data

May 3, 2021    (FR) ...................................... 2104647

(51) Int. Cl.
*H04M 1/00*        (2006.01)
*H04W 8/18*        (2009.01)
*H04W 60/04*       (2009.01)

(52) U.S. Cl.
CPC ............. *H04W 60/04* (2013.01); *H04W 8/18* (2013.01)

(58) Field of Classification Search
CPC ....... H04W 60/04; H04W 8/18; H04W 24/02; H04W 48/18

(Continued)

(56) References Cited

U.S. PATENT DOCUMENTS

| | | | | | |
|---|---|---|---|---|---|
| 10,616,820 | B2 * | 4/2020 | Youn | ................... | H04L 65/1073 |
| 11,172,437 | B2 * | 11/2021 | Kim | ...................... | H04W 48/18 |

(Continued)

FOREIGN PATENT DOCUMENTS

| | | |
|---|---|---|
| CN | 112737808 A | 4/2021 |
| WO | 2019056365 A1 | 3/2019 |

(Continued)

OTHER PUBLICATIONS

"3rd Generation Partnership Project; Technical Specification Group Services and System Aspects; System architecture for the 5G System (5GS); Stage 2 (Release 16)", Mar. 20, 2020, 3GPP Draft; 23501-G40_Waiting_23501_CR2179_CRS_Implemented_CR2195FIX_R2, 3rd Generation Partnership Project, Mobile Competence Centre; 650, Route Des Lucioles; F-06921 Sophia-Antipolis Cedex, France.

(Continued)

*Primary Examiner* — Amancio Gonzalez
(74) *Attorney, Agent, or Firm* — David D. Brush; Westman, Champlin & Koehler, P.A.

(57)        ABSTRACT

A method for registering a user terminal with a network-sliced communications network, by a network device. The method includes: receiving a registration request sent by the user terminal to register with the network; obtaining, in context information associated with the user terminal, an authorization/rejection of at least one network slice previously authorized/rejected during a previous registration of the user terminal for the same type of access and the same registration area, or an autonomous determination of a registration status for each of the network slices subscribed to by the user and identified by the network device in a network parameter including the identifiers of all the network slices subscribed to by the user, delivering a registration decision.

21 Claims, 3 Drawing Sheets

(58) Field of Classification Search
USPC ........................................................ 455/435.1
See application file for complete search history.

(56) References Cited

U.S. PATENT DOCUMENTS

| | | | | |
|---|---|---|---|---|
| 11,425,634 B2 * | 8/2022 | Zhu | ........................ | H04W 76/11 |
| 11,438,831 B2 * | 9/2022 | Stille | .................... | H04M 15/63 |
| 11,457,500 B2 * | 9/2022 | Jin | ........................ | H04W 76/27 |
| 12,063,584 B2 * | 8/2024 | Casati | ................... | H04W 48/18 |
| 12,096,253 B2 * | 9/2024 | Kahn | ........................ | H04L 1/22 |
| 12,192,943 B2 * | 1/2025 | Johansson | ............ | H04W 48/18 |
| 12,267,772 B2 * | 4/2025 | Wang | ................... | H04W 48/18 |
| 2019/0029065 A1 | 1/2019 | Park et al. | | |
| 2022/0394607 A1 * | 12/2022 | Ramle | ................. | H04L 41/0806 |
| 2023/0084453 A1 * | 3/2023 | Hedman | ............... | H04W 60/00 |
| | | | | 455/435.1 |
| 2024/0064863 A1 * | 2/2024 | Dauneria | .............. | H04W 76/34 |
| 2024/0187861 A1 * | 6/2024 | Ferdi | .................... | H04W 60/06 |
| 2025/0233898 A1 * | 7/2025 | Wang | ................. | H04W 12/069 |

FOREIGN PATENT DOCUMENTS

| | | | |
|---|---|---|---|
| WO | 2020250005 A1 | 12/2020 | |
| WO | 2021083243 A1 | 5/2021 | |

OTHER PUBLICATIONS

English translation of the Written Opinion of the International Searching Authority dated Jul. 26, 2022 for corresponding International Application No. PCT/FR2022/050804, filed Apr. 27, 2022.

International Search Report dated Jul. 26, 2022 for corresponding International Application No. PCT/FR2022/050804, filed Apr. 27, 2022.

Written Opinion of the International Searching Authority dated Jul. 26, 2022 for corresponding International Application No. PCT/FR2022/050804, filed Apr. 27, 2022.

"3rd Generation Partnership Project; Technical Specification Group Services and System Aspects; System architecture for the 5G System (5GS); Stage 2 (Release 16)", Mar. 20, 2020 (Mar. 20, 2020), 3GPP Draft; 23501-G40_Waiting_23501_CR2179_CRS_Implemented_CR2195FIX_R2, 3rd Generation Partnership Project (3GPP), Mobile Competence Centre ; 650, Route Des Lucioles ; F-06921 Sophia-Antipolis Cedex. Retrieved from the Internet: URL:https://ftp.3gpp.org/tsg_sa/WG2_Arch/Latest_SA2_Specs/.

* cited by examiner

[Fig. 1]
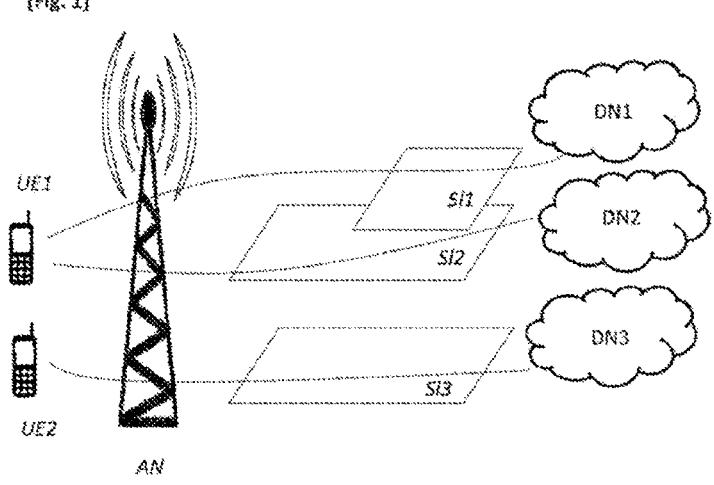
[Fig. 2]
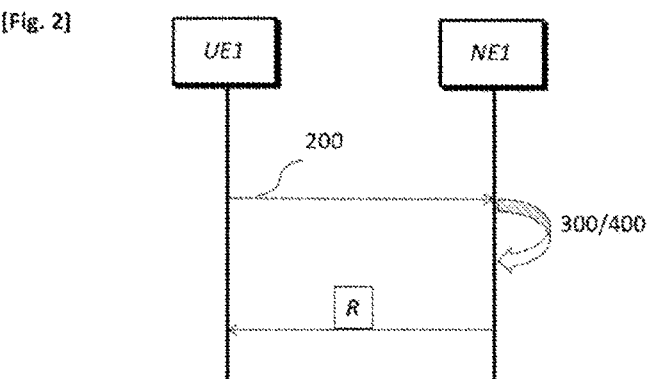

[Fig. 3]
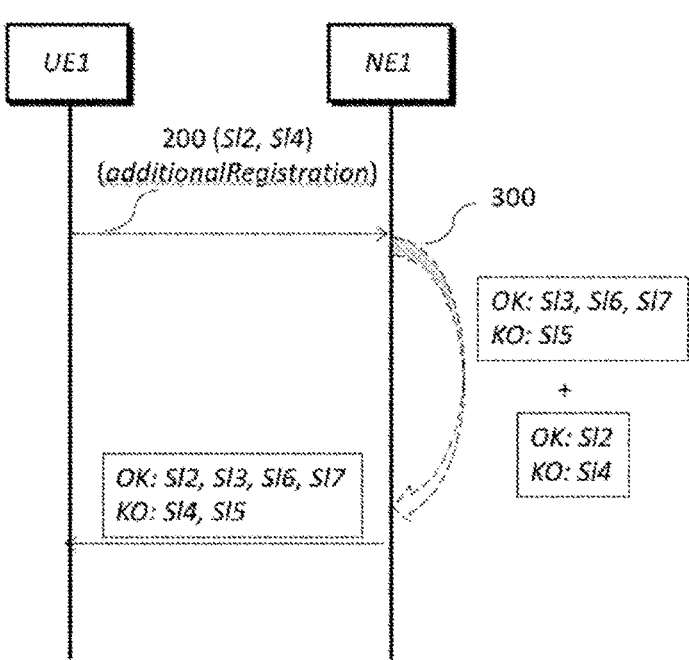

[Fig. 4]
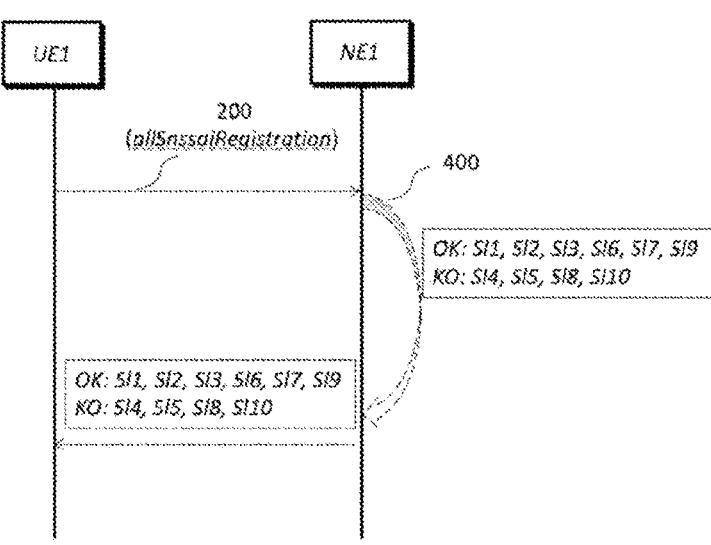

METHOD FOR REGISTERING A USER TERMINAL WITH A NETWORK-SLICED COMMUNICATION NETWORK

CROSS-REFERENCE TO RELATED APPLICATIONS

This Application is a Section 371 National Stage Application of International Application No. PCT/FR2022/050804, filed Apr. 27, 2022, which is incorporated by reference in its entirety and published as WO 2022/234219 A1 on Nov. 10, 2022, not in English.

TECHNICAL FIELD

The invention relates to communication networks, and in particular to networks in which network slices are instantiated, allowing dedicating communication network equipment/functions/configurations for specific services and/or specific clients and/or specific terminals.

PRIOR ART

Certain network architectures specified and deployed nowadays are structured into network slices enabling a user terminal, according to the subscription of the client (the terminal can be used by a user other than the client having made a subscription; the term user or client will be used indifferently later in for simplicity), to benefit from specific functions (routing, processing, administration . . . ) adapted to one or more criterion/criteria among the customer type, the terminal type, the application type, the access type, etc. Thus, each slice allows offering a service quality and security level in accordance with one or more of the aforementioned criteria. It should also be noted that the clients and the terminals are on the one hand increasingly diversified (IoT terminals (standing for Internet of Things), smartphones, robots, residential gateways, a variety of so-called communicating equipment . . . ) and on the other hand feature quite different capabilities and needs. This development is also accompanied by a capability of at least part of these terminals to access, simultaneously or not, a plurality of applications whose data are possibly conveyed on distinct network slices. It should be noted that these developments concern both fixed networks and mobile networks and that the specifications of so-called fifth generation (5G) networks integrate this sliced network structure.

According to the specifications of 5G networks to which particular reference will be made in the rest of this description, a user terminal should implement a registration procedure to be able to access the slices subscribed by the user (for example in his/her 5G subscription). The subscribed slice identifiers S-NSSAI (standing for Single-Network Slice Selection Assistance Information) are stored locally by the terminal (in a piece of data denoted Configured NSSAI) and in the network (in a piece of data denoted Subscribed NSSAI).

Hence, the registration procedure begins with a step implemented by the terminal consisting in requesting registration in general for one or more slice (s), for example by indicating the S-NSSAI slice identifier(s) in the parameter Requested NSSAI of its registration request. This request is implemented based on information stored by the user terminal, and in particular relating to the configured slices (Configured NSSAI) and possibly authorized (Allowed NSSAI) during a previous registration.

Thus, the user terminal also stores the identifiers of slices for which the terminal is authorized to activate one or more packet data session(s), by the network and in particular via an entity denoted AMF (standing for Access and Mobility Function), in a piece of data denoted, Allowed NSSAI, containing all or part of the subscribed S-NSSAI. The user terminal also stores the identifiers of slices that are forbidden thereto (by the network) in a piece of data denoted, Rejected NSSAI. These authorized/rejected slice identifiers are received by the terminal in the acceptance reply of network during its registration procedure with the network.

The registration procedure then comprises a step of determining, by the network, the authorized, respectively rejected, slices to be communicated to the user terminal. The network (in particular via the AMF entity) accepts the registration request based on the requested slices, for the access type and the registration area in use by the user terminal and an update may be made in the event of a change, for example in the subscription or location of the user terminal. The acceptance reply from the network contains information to report on a registration status (authorized/rejected/unauthenticated state) for each requested slice, for example at least one parameter amongst:

Allowed NSSAI: corresponds to the S-NSSAI identifiers of authorized slices;

Rejected NSSAI: corresponds to the S-NSSAI identifiers of rejected slices, with the rejection cause (for example "no authorization in the current public land mobile network (PLMN, standing for Public Land Mobile Network) or in the current standalone non-public network (SNPN, standing for Stand-alone Non-Public Network)" or "no authorization in the current registration area");

Configured NSSAI: corresponds to the particular case where the parameter Requested NSSAI of the registration request is absent or to the particular case where a change in the value of the Parameter Configured NSSAI has occurred;

Pending NSSAI: corresponds to the case where it is necessary and indicated in the subscription that the slice should be authenticated before it could be considered authorized, this authentication being in progress or to come.

A reply rejecting the registration request is emitted in the event that no slice could be authorized or subject to current or future authentication.

This standard registration procedure has some drawbacks relating to the choice of slices requested by the user terminal, i.e. S-NSSAI slice identifiers of the parameter Requested NSSAI of the registration request, this choice may depend on the implementation by the manufacturer of the user terminal of policies or applications defined within the user terminal, and having impacts both at the user level and at the level of the operator or the network itself.

For example, if a user wishes to access one or more slice (s) that he/she did not request during registration, he/she must initiate another registration procedure for these slices, which extends his/her access time to the service, while completing the registration procedure.

According to another example, if a user terminal first requests registration for the identifier ranges S-NSSAI #1, S-NSSAI #2 then wishes to use the identifier range S-NSSAI #3, it must make a registration request again for the slice with the identifier S-NSSAI #3. If it does not request registration at the same time for the previously registered slices (herein S-NSSAI #1 and S-NSSAI #2), then it loses the previously registered slices and it must make a registration again for each slice with the identifier S-NSSAI #1 then S-NSSAI #2, i.e. a registration for the "ancient" two slices when it wishes to use them. Not to mention that, in this case, if a data session was active on the user terminal for either one of the identifier ranges S-NSSAI #1/S-NSSAI #2, this session is interrupted at the time of acceptance of the registration of the slice with the identifier S-NSSAI #3.

Another drawback lies in the fact that the current standard requires that, in the registration request of the user terminal, the parameter Requested NSSAI contains the slice identifiers S-NSSAI of the parameter Allowed NSSAI (obtained during a previous registration) for which there is one or more active data session(s). If the user terminal does not do so, for example following a wrong configuration of the user terminal, then the active data sessions are interrupted since, according to the standard, a user terminal can only establish data sessions for authorized slices during the registration.

These situations are detrimental to an operator offering 5G services for example, because a sudden interruption of current data sessions is very negative for the user experience.

For the operator, this generates additional signaling in the network for each additional registration and its interest would be to limit the number of registrations made by a user terminal while enabling better access of the user to the services.

Finally, the number of S-NSSAI slice identifiers of the parameter Requested NSSAI per registration request is also a concern in terms of load in the network, in particular for the Internet of Things, and the current standard recommends reducing this number of S-NSSAI slice identifiers of the parameter Requested NSSAI per registration request.

Hence, there is a need for a technique allowing for an optimized procedure for registering network slices by a user terminal and a better determination of the authorized network slices both at the user terminal level and at the network level, while allowing applicability in 5G as well as any future generation of networks using a network-sliced architecture.

DISCLOSURE OF THE INVENTION

The invention addresses this need by providing a method for registering a user terminal with a network-sliced communication network, said user terminal being capable of transmitting and receiving data on the network, the user terminal comprising subscription data of a user for at least one of the slices of the network, the method being implemented at least by network equipment capable of communicating with the user terminal via the network and comprising

- a step of receiving a registration request emitted by the user terminal to register with the network;
- a step of obtaining, in context information associated with the user terminal, an authorization or a rejection of at least one of the slices of the network authorized or rejected before during at least one previous registration of the user terminal for the same access type and the same registration area, delivering a registration decision, or
- a step of autonomously determining of a registration status for each of the slices of the network subscribed by the user and identified by the network equipment in a network parameter comprising the identifiers of all the network slices subscribed by the user, delivering a registration decision.

Thus, the present technique is based on a completely new and inventive approach to the procedure for registering a terminal with a network, consisting in taking into account one or more registration (s) performed before by the terminal under the same access and location conditions or in determining, autonomously for the network (i.e. without taking into account information transmitted or not by the user terminal concerning the slices to be registered), the (i.e. the registration status authorized/rejected/unauthenticated state) of all subscribed slices identified in a network parameter listing all subscribed slices.

This approach allows considerably limiting the number of successive registrations that could be requested by a user terminal, since a current registration takes into account a history of registrations (assuming herein that the history could possibly contain the rejected slices), according to a first embodiment, or determines the status of all subscribed slices in one single registration, according to a second embodiment.

Hence, this approach also allows limiting the signaling load in the network.

Moreover, this approach also allows avoiding interruptions of data sessions which are not desired by a user, by retaining in the list of authorized slices all those having been authorized before during previous registrations according to a first embodiment or by making an additional registration unnecessary second embodiment.

According to a first embodiment, relating to a cumulative registration mode, the registration decision comprises at least one authorized slice parameter comprising at least one identifier of one of the slices of the network authorized before during at least one previous registration of the user terminal for the same access type and the same registration area and/or at least one rejected slice parameter comprising at least one identifier of one of the network slices rejected before during at least one previous registration of the user terminal for the same access type and the same registration area.

Thus, according to this first embodiment, any registration request received by network equipment, originating from a user terminal, is processed so as to take into account the authorized and/or rejected status, known in context information associated with the user terminal, for one or more slice (s) requested before during one or more previous registration (s), so as to deliver a list of authorized slices and/or a list of rejected slices, for example in the form of standardized parameters such as Allowed NSSAI and Rejected NSSAI.

This allows replying to the user terminal with a list of the authorized slices and/or a list of the rejected slices taking into account the history of registrations, without the user terminal having specified it, therefore without requiring modifications on the user terminal side concerning the registration request. It is the network which takes the initiative to perform a "cumulative" registration.

In addition, this allows avoiding the user terminal having to include in the request, as is currently the case in the standard, the identifiers of the slices authorized before, and on which it potentially has a packet data session in progress, otherwise this session will be cut off. According to this embodiment, any previously authorized slice keeps this status, even though the user terminal has not included it in its current registration request.

According to a particular aspect, where the registration request comprises at least one identifier of a slice subscribed by the user and the obtainment step comprises a sub-step of determining a registration status for said at least one slice identified in the request.

Thus, according to this first embodiment, if the registration request comprises one or more identifier(s) of one or more subscribed slice(s) (for example via the parameter S-NSSAI in the parameter Requested NSSAI), the network equipment determines the authorized/rejected/unauthenticated (i.e. requiring a slice authentication) status. This determination sub-step may be implemented before, after or simultaneously with the step of obtaining the status of the slices requested before during one or more previous registration(s).

Thus, if the status of the slice(s) identified in the request is not already known from a previous registration, their status is determined during this current registration.

According to a particular feature, the identifier of the slice identified in the request is included, in the registration decision, in the authorized slice parameter or the rejected slice parameter or an unauthenticated slice parameter, depending on the determination sub-step.

Thus, according to this first embodiment, once the network equipment has determined the authorized/rejected status of the slice(s) identified in the request, it includes the identifier(s) of the slice(s) identified in the request in either one of the aforementioned parameters, listing the authorized slices respectively the rejected slices. It is also possible that the slice(s) or one of the slices identified in the request will be authorized only after successful authentication. In this case, another parameter listing the slices "pending authentication" is delivered by the network, for example in the form of the standardized parameter Pending NSSAI.

This allows replying to the user terminal with a list of authorized slices and/or a list of rejected slices taking into account the history of the registrations and the slice (s) included in the registration request, therefore also without requiring modifications on the user terminal side regarding the registration request.

According to a particular aspect, where the registration request comprises at least one slice accumulation indicator and the obtainment step comprises a sub-step of decoding said received at least one slice accumulation indicator delivering a positive or negative accumulation indication.

Thus, according to this variant of the first embodiment, it is provided that the registration request comprises a specific parameter, for example denoted AdditionalRegistration, indicating whether or not a "cumulative" registration is required. Hence, this parameter should be decoded by the network equipment in order to determine the continuation of the procedure, depending on whether a cumulative registration is required or not. Hence, this variant enables the user terminal to specifically signal to the network equipment whether or not it wishes a cumulative registration, for example in the form of a specific parameter added in the request, or in the form of a parameter modifying the NSSAI format of the current standard. For example, this parameter corresponds to a Boolean that could take on the value 1 if a cumulative registration is required and the value zero otherwise.

In particular, this approach allows signaling to the network equipment that a cumulative registration is desired and therefore implementing such a cumulative registration, the cumulative registration not being implemented by default (the absence of a parameter or the absence of value for the parameter not resulting in a cumulative registration).

According to a particular feature, if said accumulation indication is positive, the registration decision comprises at least one authorized slice parameter comprising at least one identifier of one of the network slices authorized before during at least one previous registration of the user terminal for the same access type and the same registration area and/or at least one rejected slice parameter comprising at least one identifier of one of the network slices rejected before during at least one previous registration of the user terminal for the same access type and the same registration area.

Moreover, in the registration decision, the identifier of the slice identified in the request is included in the authorized slice parameter or the rejected slice parameter or an unauthenticated slice parameter, depending on the determination sub-step.

According to a particular in feature, the authorized slice parameter included in the registration decision, said at least one identifier of one of the network slices authorized before during at least one previous registration of the user terminal for the same access type and the same registration area corresponds to a slice for which the user terminal has an active packet data session.

Thus, according to this other variant of the first embodiment, the network equipment performs a cumulative registration only with slices authorized before for which the user terminal has an active data session. This allows further limiting network signaling by potentially listing fewer slices in response to a record request, while ensuring that active data sessions are not terminated even though the user terminal has failed to request them again.

According to a second embodiment, relating to a global registration mode, any registration request received by network equipment, originating from a user terminal, is processed so as to take into account each slice subscribed by the user/client of the registration request. The autonomous determination step does not take into account one or more slice identifier(s) included or not in the request, i.e. the autonomous determination is triggered without even considering the presence or absence of slice information (i.e. the presence of a parameter Requested NSSAI, a fortiori the value of this parameter when it is present).

Thus, according to this second embodiment, the network equipment autonomously identifies all subscribed slices, i.e. without taking into account any slice identifiers present in the registration request, in order to determine afterwards its authorized/rejected/unauthenticated status. This autonomy enables the network not to depend on the registration request to identify the slices to register, thereby limiting the steps to be implemented.

According to a particular aspect, the registration decision comprises at least one authorized slice parameter comprising the identifiers of all authorized subscribed slices and/or or at least one rejected slice parameter comprising the identifiers of all rejected subscribed slices and/or at least one unauthenticated slice parameter comprising the identifiers of all subscribed slices awaiting authentication.

Thus, according to this second embodiment, the network equipment systematically determines the authorized/rejected/unauthenticated status for all subscribed slices upon reception of a registration request and delivers a list of authorized slices and/or a list of rejected slices, for example in the form of standardized parameters such as Allowed NSSAI and Rejected NSSAI. It is also possible that one or more of the subscribed slices will be authorized only after successful authentication. In this case, another parameter listing the slices waiting/being authenticated is delivered by the network, for example in the form of the standardized parameter Pending NSSAI.

This approach allows limiting the number of registrations because the user terminal receives the status of all subscribed slices, and therefore can take it into account for any subsequent activation of packet data sessions. Hence, network signaling is also considerably limited.

According to a particular feature, the registration request comprises at least one global registration indicator triggering a step of decoding said at least one received global registration indicator delivering a positive or negative global registration indication.

Thus, according to this variant of the second embodiment, it is provided that the registration request comprises a specific parameter, for example denoted allSnssaiRegistration, indicating whether a global registration is required or not. Hence, this parameter transmitted by the user terminal should be decoded by the network equipment in order to determine the rest of the procedure, depending on whether a global registration is required or not. Hence, this variant enables the user terminal to specifically signal to the network equipment whether or not it wishes a global registration, for example in the form of a specific parameter added in the request, or in the form of a parameter modifying the NSSAI format of the current standard. For example, this parameter corresponds to a Boolean which could take on the value 1 if a global registration is required and the value zero otherwise, the global registration not being implemented by default (the absence of parameter or the absence of value for the parameter not resulting in a global registration).

For example, if said global registration indication is positive, the determination step is triggered and the registration decision comprises at least one authorized slice parameter comprising the identifiers of all authorized subscribed slices and/or at least one rejected slice parameter comprising the identifiers of all rejected subscribed slices and/or at least one unauthenticated slice parameter authentication comprising the identifiers of all subscribed slices awaiting authentication.

On the other hand, if said global registration indication is negative and if the registration request comprises at least one identifier of a slice subscribed by the user, the determination step is triggered only for the slice(s) identified in the request and the registration decision comprises at least one authorized slice parameter comprising at least one identifier of a slice identified in the request and authorized and/or at least one rejected slice parameter comprising at least one identifier of a slice identified in the request and rejected and/or at least one unauthenticated slice parameter comprising at least one identifier of a slice identified in the request and awaiting authentication.

Thus, according to an implementation of this variant of the second embodiment, if the user terminal has not requested global registration but if it has identified one or more slice(s) in the registration request, then network the determines the authorized/rejected/unauthenticated status for the slice(s) identified in the request and therefore does not perform a global registration.

In addition, if said global registration indication is negative and if the registration request does not include an identifier of a slice subscribed by the user, the determination step is triggered and the registration decision comprises at least one authorized slice parameter comprising the identifiers of all authorized subscribed slices and/or at least one rejected slice parameter comprising the identifiers of all rejected subscribed slices and/or at least one unauthenticated slice parameter comprising the identifiers of all subscribed slices awaiting authentication.

On the other hand, according to another implementation of this variant of the second embodiment, if the user terminal has not requested global registration and has not identified any slices in the registration request, then the network performs a global registration by default.

According to a particular aspect, the registration decision comprises a successful global registration indicator when all subscribed slices are authorized.

Thus, according to this implementation, the network equipment also delivers a global registration indicator (for example denoted allSnssaiRegistration) when all of the subscribed slices have been registered, allowing limiting the signaling of the reply, which does not comprise the parameters listing the authorized subscribed slices but simply a global registration success indicator.

The present technique also relates to a method of requesting activation of a packet data session for a user terminal capable of transmitting and receiving data on a network-sliced communication network, the method being implemented in said terminal and comprising a request for activation of a packet data session on at least one slice of the network, the activation request taking into account a registration decision, originating from at least one network equipment capable of communicating with the user terminal via the network, to a registration request emitted by the terminal, the registration decision comprising a global registration success indicator indicating that all of the slices subscribed by a user are authorized.

Thus, according to this implementation, the user terminal takes into account, requesting the activation of a packet data session, a specific parameter transmitted in response to a registration request. According to one variant, upon reception of the parameter indicating that all subscribed slices have been registered (allSnssaiRegistration), the user terminal updates its local parameter Allowed NSSAI with the Configured NSSAI value which contains all the subscribed slices.

According to a particular feature of the registration method, where the registration request comprises a slice change indicator, the method comprises a prior step of verifying whether at least one subscribed slice has been authorized or rejected before during at least one previous registration of the user terminal for the same access type and the same registration area.

Thus, according to this approach, the user terminal or the network equipment first performs a step of verifying the authorized/rejected status of one or more subscribed slice(s), in order to lighten the registration request (when it is the user terminal which implements this verification) or to directly reject this request (when it is the network equipment which implements this verification and the registration state is already known for all of the requested slices), when this registration request is intended for a slice change (and not when the request corresponds to a request for periodic or storage duration update, to a first registration, to a registration area change or an emergency . . . ).

For example, the prior verification step is implemented by the user terminal and if the verification is positive, the registration request does not contain the identifier of the slice authorized or rejected before.

According to another example, the prior verification step is implemented by the network equipment for the slice identifiers included in the registration request and where, if the verification is positive for all of the slice identifiers included in the registration request, the obtainment step is not implemented and the registration request is rejected.

Thus, according to this approach, and in the context of a cumulative registration, the network equipment verifies whether all of the slices identified in the request have already undergone a previous registration, in which case the request is rejected as unnecessary: the user terminal already knows the status of the slices identified in its request.

According to a particular aspect, where the registration request comprises a slice change indicator and where the method comprises a prior verification step, implemented by the network equipment, if all subscribed slices have been authorized or rejected before during at least one previous registration of the user terminal for the same access type and the same registration area and, if the verification is positive, the obtainment or determination step is not implemented and the registration request is rejected.

Thus, according to this approach, and in the context of a cumulative or global registration, the network equipment verifies whether all of the subscribed slices have already undergone a previous registration, in which case the request is rejected as unnecessary: the user terminal already knows the status of all subscribed slices.

The invention also relates to a computer program product comprising program code instructions for the implementation of a method as described before, when executed by a processor.

The invention also relates to a computer-readable storage medium on which a computer program is stored comprising program code instructions for the execution of the steps of the method according to the invention as described hereinabove.

Such a storage medium may be any entity or device capable of storing the program. For example, the medium may include a storage means, such as a ROM, for example a CD ROM or a microelectronic circuit ROM, or a magnetic recording means, for example a flash disk or a hard disk.

On the other hand, such a storage medium may be a transmissible medium such as an electrical or optical signal, which may be conveyed via an electrical or optical cable, by radio or by other means, so that the program computer contained therein could be executed remotely.

In particular, the program according to the invention may be downloaded onto a network, for example the Internet network.

Alternatively, the storage medium may be an integrated circuit in which the program is incorporated, the circuit being adapted to execute or to be used in the execution of the aforementioned display control method.

The invention also relates to a device for registering a user terminal with a network-sliced communication network, said user terminal being capable of transmitting and receiving data on the network, the user terminal comprising subscription data of a user for at least one of the slices of the network, the device being implemented at least by network equipment capable of communicating with the user terminal via the network and comprising a receiver, a transmitter, a processor and a memory coupled to the processor with instructions intended to be executed by the processor to:

receive a registration request emitted by the user terminal to register with the network;

obtain, in context information associated with the user terminal, an authorization or a rejection of at least one of the slices of the network authorized or rejected before during at least one previous registration of the user terminal for the same access a type and the same registration area, delivering registration decision, or autonomously determine a registration status for each of the slices of the network subscribed by the user and identified by the network equipment in a network parameter comprising the identifiers of all the network slices subscribed by the user, delivering a registration decision.

This device, capable of implementing in all embodiments thereof the registration method that has just been described, is intended to be implemented in a network entity.

This device and the corresponding computer program mentioned before have at least the same advantages as those conferred by the registration method according to the present technique.

The network entities described in the present application may correspond to virtual entities, also called functions.

The invention also relates to A user terminal capable of transmitting and receiving data on a network-sliced communication network with which it is registered, the user terminal comprising subscription data of a user for at least one of the slices of the network, and comprising a receiver, a transmitter, a processor and a memory coupled to the processor with instructions intended to be executed by the processor to:

verify whether at least one subscribed slice has been authorized or rejected before during at least one previous registration of the user terminal for the same access type and the same registration area and, if the verification is positive, the registration request emitted by the user terminal to register with the network does not contain the identifier of the slice authorized or rejected before.

This user terminal is capable of implementing the registration method in all embodiments thereof, encompasses the user terminal ("user equipment" specified by the 3GPP) and may correspond for example to an IoT terminal (standing for Internet of Things), a smartphone, a robot, a so-called communicating piece of equipment, a residential gateway, accessing the network via any type of fixed or mobile access specified by the 3GPP or not, the network possibly corresponding to a so-called PLMN public network or a so-called NPN non-public network (standing for Non-Public Network in particular a so-called SNPN standalone non-public network, standing for Stand-alone Non-Public Network).

PRESENTATION OF THE FIGURES

Other aims, features and advantages of the invention will appear more clearly upon reading the following description, given as a simple illustrative and non-limiting example, with reference to the figures, wherein:

FIG. 1 shows an example of a simplified architecture of a communication network in which the registration method is implemented according to an embodiment of the invention;

FIG. 2 illustrates a block diagram of the registration method according to an embodiment of the invention;

FIG. 3 illustrates a block diagram of an exemplary implementation of the registration method according to a first embodiment of the invention;

FIG. 4 illustrates a block diagram of an exemplary implementation of the registration method according to a second embodiment of the invention.

DETAILED DESCRIPTION OF EMBODIMENTS OF THE INVENTION

The present technique provides an optimized determination of authorized/rejected slices for a user terminal, based on the slices subscribed by the user, allowing limiting signaling and network load and avoiding undesirable packet data session interruptions, while simplifying the registration procedure.

To do so, the present technique provides a registration procedure based on an inventive concept based on a cumulative aspect of the determination of the authorized/rejected slices no and longer on the determination of authorization or rejection of the slices specifically identified n the registration request as is the case according to current techniques.

According to a first embodiment, the cumulative aspect lies in taking into account one or more registration(s) performed beforehand by the terminal, for the same access type and the same registration area, and in accumulating, where applicable, the results of this or these registration s) performed beforehand with a registration request for one or more slice(s) that are not yet authorized or rejected.

According to a second embodiment, the cumulative aspect lies in taking into account all of the subscribed slices, i.e. performing a global registration for all subscribed slices, without taking into account information transmitted or not by the user terminal in the registration request concerning the slices to be registered.

Finally, according to another feature, compatible with the aforementioned two embodiments, the proposed technique allows controlling in advance the authorized or rejected status of one or all of the slices likely to be the object of a registration request from a user terminal.

An example of a network architecture, in which the proposed technique could be implemented, is first illustrated, in a simplified manner, in FIG. 1. One or more user terminal(s), denoted UE1, UE2, access (es), via an access network AN, one or more data network(s) DN1, DN2 or DN3, via one or more slice(s) SI1, SI2 and SI3.

Next, a user terminal UE1 that wishes to receive data over one or more slice(s) of a network as illustrated in FIG. 1 is considered.

To do so, a user U1, for example the main user of the user terminal UE1, subscribes, with his/her telecommunications operator, to one or more slice(s) of the network, for example according to his/her habits or his/her wishes for content consumption, the performances of his/her UE1 user terminal . . . . Following his/her subscription, subscription data DSub (including in particular, in a parameter denoted Subscribed NSSAI, the identifiers of the slices to which the user U1 has subscribed) are created and stored in a subscription database. In addition, a subscription identifier IdSub, for example the variable SUPI (or standing for Subscription Permanent Identifier) allows access to these subscription data DSub, for example when they are stored in subscription data management network equipment. In particular, this subscription identifier is stored in the SIM card of the user terminal UE1 and is representative of the subscription, containing one or more subscribed slices, without being exclusively associated with the user U1 or the user terminal UE1. Indeed, another user U2 may have obtained authorization from the user U1 to use his/her subscription, or the SIM card storing the subscription identifier may be transferred from the user terminal UE1 to another user terminal UE2 for example.

More particularly, the present technique relates to the procedure of registration of a user terminal UE1 with the network, with a view to subsequently activate a packet data session on one or more subscribed network slice(s).

FIG. 2 illustrates the main stages of a registration method according to the present technique, implemented by a piece of equipment of the network NE1.

Thus, a piece of equipment of the network NE1 implements a step 200 of receiving a registration request emitted by the user terminal UE1 to register with the network, and according to the first or second embodiment, described in detail hereinafter, the network equipment NE1 implements:

a step 300 of obtaining, in context information associated with the user terminal, an authorization or a rejection of at least one of the slices of the network authorized or rejected before during at least one previous registration of the user terminal for the same access type and the same registration area, delivering a registration decision R, or a step 400 of autonomously determining a registration status for each of the slices of the network subscribed by the user and identified by the network equipment in a network parameter comprising the identifiers of all of the slices of the network subscribed by the user, delivering a registration decision R.

Description of the First Embodiment

As indicated hereinabove, this first embodiment allows taking into account, at the time of a current registration request emitted by a user terminal UE1, one or more registration(s) performed beforehand by this user terminal UE1, for the same access type and the same registration area. The processing of the registration request by the network in this first embodiment is different the standard because it concerns a cumulative registration instead an of additional registration. It should also be noted, as described later on, that the request emitted by the user terminal could further take on additional characteristics compared to the standard, as described hereinafter in a second solution.

Regardless of the solution, the network equipment, which receives a registration request from a user terminal, verifies whether it has access to context information associated with the user terminal, in order to obtain in particular information relating to an authorization or a rejection of at least one of the slices of the network authorized or rejected before during at least one previous registration of the user terminal for the same access type and the same registration area. For example, this context information corresponds to the variable UE context, resulting from the previous registration and which could reflect an accumulation of several previous registrations according to the present technique, and in particular includes an Allowed NSSAI (identifiers of slices authorized before) respectively Rejected NSSAI (identifiers of slices rejected before) value, which may be denoted as Allowed NSSAI (UE context) respectively Rejected NSSAI (UE context). Obtaining the authorized/rejected slice(s) information resulting from the accumulation of a previous registration with one or more slices possibly requested in the registration request, may be implemented according to different variants, described hereinafter.

Afterwards, depending on whether or not the registration request includes or one more slice identifier(s) to be registered, the network implements different steps described hereinafter to perform a cumulative registration, i.e. to add to the result of the obtainment of information relating to a previous registration, via the context information, the result of an authorization or a rejection determination for the slice(s) identified in the registration request, when so is the case. For example, this determination delivers a, Allowed NSSAI (subscription) value, with the identifiers of authorized slices with regards to the subscription for the user terminal, among the slices identified in the registration request, and/or a Rejected NSSAI (subscription) value with the identifiers of rejected slices with regards to the subscription for the user terminal, among slices identified in the registration request.

Hence, the network equipment that received the registration request potentially has the following data:

Allowed NSSAI (subscription) to describe, when the request (Requested NSSAI) includes one or more slice identifier(s) (S-NSSAI), the identifiers of authorized slices with regards to the subscription for the user terminal;

Rejected NSSAI (subscription) to describe, when the request (Requested NSSAI) includes one or more slice identifier(s) (S-NSSAI), the identifiers of rejected slices with regards to the subscription for the user terminal;

Allowed NSSAI (UE context) to describe the authorized slice identifiers (S-NSSAI) already contained in the context information associated with the user terminal and accessible by the network equipment by the previous registration;

Rejected NSSAI (UE context) to describe the rejected slice identifiers (S-NSSAI) already contained in the context information associated with the user terminal and accessible by the network equipment by the previous registration.

These three variants differ from each other depending on the distribution of tasks between different network pieces of equipment, and in particular between access control equipment (for example the AMF network entity, standing for Access and Mobility Function) and slice instance selection equipment (for example the NSSF network entity standing for Network Slice Selection Function) to determine the authorized/rejected slices.

According to a first variant, the AMF access control equipment verifies whether it has access to context information associated with the user terminal, in order to obtain in particular information relating to an authorization or a rejection of at least one of the slices of the network authorized or rejected beforehand during at least one previous registration of the user terminal for the same access type and the same registration area. If so is the case, the AMF access control equipment therefore obtains the values denoted Allowed NSSAI (UE context) respectively Rejected NSSAI (UE context).

Afterwards, the AMF access control equipment determines itself which slices identified in the request are authorized or rejected, with regards to the subscription of the user, or interrogates the NSSF slice instance selection equipment, by providing the identifier(s) included in the request (Requested NSSAI) and the identifier(s) of the subscribed slices (for example via the parameter Subscribed NSSAI), to obtain Allowed NSSAI (subscription) and/or Rejected NSSF (subscription). From the NSSF perspective, this corresponds to processing as standardized with the use of a Requested NSSAI and Subscribed NSSAI parameter.

Finally, the AMF access control equipment accumulates, preferably without duplicates, the non-empty values obtained before to deliver Allowed NSSAI and/or Rejected NSSAI such that:

Allowed *NSSAI* =

Allowed *NSSAI* (*UE* context) + Allowed *NSSAI* (subscription);

Rejected *NSSAI* =

Rejected *NSSAI* (*UE* context) + Rejected *NSSAI* (subscription).

According to this first variant, it is therefore the AMF access control equipment which accumulates the registration of the slices identified in the request and the slices authorized/rejected before during one or more previous registration(s).

According to a particular situation, a slice identified in the registration request may, in view of the subscription data, require a prior authentication step before being authorized. In this case, it appears neither in the list of authorized slices nor in those of rejected slices, but in another list, denoted for example Pending NSSAI.

Moreover, the steps of verifying access to context information associated with the user terminal (in order to obtain in particular information relating to an authorization or a rejection of at least one of the slices of the network authorized or rejected before during at least one previous registration of the user terminal for the same access type and the same registration area) and of determining the Allowed NSSAI (subscription) and/or Rejected NSSAI (subscription) values may be implemented in any order and independently, so that the accumulation step could be implemented afterwards.

According to a second variant, the AMF access control equipment verifies whether it has access to context information associated with the user terminal, in order to obtain in particular information relating to an authorization or a rejection of at least one of the slices of the network authorized or rejected before during at least one previous registration of the user terminal for the same access type and the same registration area. If so is the case, the AMF access control equipment therefore obtains the Allowed NSSAI (UE context), respectively Rejected NSSAI (UE context) values.

Afterwards, the AMF access control equipment computes a "cumulative Requested NSSAI" value, resulting from the accumulation without duplicates of:

S-NSSAI values of the Requested NSSAI received in the registration request of the user terminal;

obtained Allowed NSSAI (UE context) and possibly Rejected NSSAI (UE context) values.

Finally, the AMF control access equipment interrogates the NSSF slice instance selection equipment by providing it with the "cumulative Requested NSSAI" (as computed hereinabove) and the identifier(s) of the subscribed slice(s) (for example via the parameter Subscribed NSSAI).

The NSSF slice instance selection equipment proceeds with the determination of the values:

Allowed NSSAI, comprising the slice identifiers among the "cumulative Requested NSSAI" values that are authorized with regards to the subscription for the considered access type and registration area;

Rejected NSSAI, comprising the slice identifiers among the "cumulative Requested NSSAI" values that are rejected with regards to the subscription for the considered access type and registration area.

According to this second variant, it is therefore the AMF access control equipment which cumulates the slices identified the request and the slices authorized before during one or more previous registration(s) before interrogating the NSSF slice instance selection equipment.

According to a third variant, the AMF access control equipment interrogates the NSSF slice instance selection equipment to determine which slices identified in the request are authorized or rejected, with regards to the subscription of the user, by providing it with the identifier(s) included in the request (Requested NSSAI) and the identifier(s) of the subscribed slices (for example via the parameter Subscribed NSSAI), and also by providing it with the values obtained with regards to the user context information Allowed NSSAI (UE context) and/or Rejected NSSAI (UE context).

Thus, based on these values, the NSSF slice instance selection equipment determines the Allowed NSSAI (subscription) and/or Rejected NSSAI (subscription) values for the identifiers received in the request and accumulates them with the Allowed NSSAI (UE context) and/or Rejected NSSAI E context) values to deliver Allowed NSSAI and/or Rejected NSSAI such that:

Allowed $NSSAI =$

Allowed $NSSAI$ ($UE$ context) + Allowed $NSSAI$ (subscription);

Rejected $NSSAI =$

Rejected $NSSAI$ ($UE$ context) + Rejected $NSSAI$ (subscription).

Alternatively, the NSSF equipment may compute a "cumulative Requested NSSAI" value, i.e. process the AMF request as if the Requested NSSAI value were a "cumulative Requested NSSAI" resulting from the accumulation without duplicates of:
  S-NSSAI values of the Requested NSSAI of the registration request of the user terminal;
  Allowed NSSAI (UE context) and possibly Rejected NSSAI (UE context) values
and thus determine the values of:
  Allowed NSSAI, comprising the slice identifiers among the "cumulative Requested NSSAI" values that are authorized with regards to the subscription for the considered access type and registration area;
  Rejected NSSAI, comprising the slice identifiers among the "cumulative Requested NSSAI" values that are rejected with regards to the subscription for the considered access type and registration area.

According to this third variant, it is therefore the NSSF slice instance selection equipment which cumulates the registration of the slices identified in the request and the slices authorized before during one or more previous registration(s).

According to a particular situation, a slice identified in the registration request may, in view of the subscription data, require a prior authentication step before being authorized. In this case, it appears neither in the list of authorized slices nor in those of rejected slices, but in another list, denoted for example Pending NSSAI.

According to these three variants, the AMF access control equipment knows the parameter Subscribed NSSAI for example by interrogating another subscription data management equipment (for example the UDM entity, standing for Unified Data Management, according to the standard in force storing these subscription data itself or able to obtain them from one or more other entity/entities such as the UDR, standing for Unified Data Repository ensuring storage thereof).

Moreover, according to the current standard, it is known to send information to the NSSF slice instance selection equipment, like for example the Requested NSSAI and Subscribed NSSAI information. On the other hand, the present technique provides for creating a new parameter to provide the NSSF slice instance selection equipment with the Allowed NSSAI (UE context) and/or Rejected NSSAI (UE context) information for the third variant.

The second solution is described, with now reference to FIG. 3, according to which the registration request is different compared to the standard to enable the user terminal to indicate that a cumulative registration is required.

According to a first variant, a specific parameter, slice accumulation indicator, is added in the registration request and according to a second variant, a parameter already present in the registration request is modified, by adding a parameter or by modifying an existing parameter. For example, the format of the NSSAI parameter (standing for Network Slice Selection Assistance Information, representing a set of slices) is augmented by an optional parameter, denoted additionalRegistration, of the Boolean type indicating:
  when it is equal to the value "1", the user terminal wishes to perform a cumulative registration;
    when it is equal to the value "0" (or when it is not present (second solution described hereinafter)), that the user terminal does not wish to perform a cumulative registration.

During a decoding sub-step, the network equipment interprets or decodes the slice accumulation indicator (for example the above-described additionalRegistration parameter) received in the registration request originating from the user terminal, so as to deliver a positive or negative accumulation indication depending on the value of the indicator.

Afterwards, if the accumulation indication is positive, i.e. the user terminal requires a cumulative registration, then the network equipment implements a step 300 of obtaining, in context information associated with the user terminal, an authorization or a rejection of at least one of the slices of the network authorized or rejected before during at least one previous registration of the user terminal for the same access type and the same registration area. This step 300 is described in detail hereinafter, in connection with the second solution.

On the other hand, if the accumulation indication is negative, then the network equipment implements a "classic" registration taking into account only the slice identifiers specified in the registration request when this is the case, or delivers a registration decision based only on the previous registration(s), as described hereinafter in connection with the second solution.

In essence, in the example illustrated in FIG. 3, the user terminal UE1 requests to register, cumulatively, with the network for the slices identified by the identifiers SI2 and SI4, the user having subscribed before to the slices SI1 to SI10. For example, and as hereinafter, the registration request described comprises these two identifiers SI2 and SI4. Upon reception 200 of this cumulative registration request, and after having decoded the "additionalRegistration" parameter present in the registration request, the network equipment NE1 obtains, during a step 300, in context information associated with the user terminal, the status of the slices authorized or rejected before during at least one previous registration of the user terminal for the same access type and the same registration area, in this example, the slices SI2, SI3, SI5, SI6 and SI7. In this case, in this example, the slices SI3, SI6 and SI7 have already been authorized and the slice SI5 has already been rejected. Afterwards, the network equipment NE1 determines the status of the slices identified in the request, namely SI2, authorized, and SI4, rejected. Finally, the network equipment NE1 delivers a registration decision comprising the authorized slices SI2, SI3, SI6 and SI7 and the rejected slices SI4 and SI5. Hence, in response to its registration request for 2 slices, the user terminal UE1 receives information is more complete than according to the techniques of the prior art.

Thus, in this example, the accumulation of registrations is implemented upon explicit request from the user and is not implemented by default by the network entity.

According to another example, the network entity systematically implements a cumulative registration as soon as it receives a registration request: the use of a parameter originating from the user terminal in its registration request is then unnecessary and in any case would not be analyzed by the network equipment. The network entity systematically implements the cumulative registration to replace the additional registration provided for in the standard.

According to another example, the network entity systematically implements the cumulative registration by choice according to the policy of the operator, which means that the network equipment would be capable of performing an additional registration according to the standard and a cumulative registration according to the invention, and the operator could configure it to apply one rather than another according to its own policy (note that the configuration of the registration type is not restrictive and could cover additional registration, cumulative registration, global registration, inter alia).

According to a last example, the network entity conditionally implements the cumulative registration by choice according to the policy of the operator, which means that the network equipment would be capable of performing an additional registration according to the standard and a cumulative registration according to the invention but would implement cumulative registration when one or more condition(s) is/are met, for example only for an IoT terminal and/or a terminal accessing from a fixed access.

According to a third solution, the accumulation of registrations of the slices possibly identified in the request is implemented only with the slices authorized before during one or more previous registration(s) and for which the user terminal has an active packet data session. To do so, the AMF access control equipment has access, via the context information associated with the user terminal, to information of each active packet data session (for example via the PDU Session level context parameter) enabling it in particular to know the identifiers of the slices concerned by an active session.

Hence, this first embodiment allows limiting the number of registrations triggered by the user terminal, because, thanks to cumulative registration, the slices registered during a previous registration remain registered upon the next registration. Hence, this allows limiting the signaling load in the network. Finally, this allows avoiding an undesirable interruption of an active packet data session, even if, by error, the user terminal has not identified in the current registration request the slice identifier(s) for which a packet data session is in progress.

In addition, this first embodiment allows for great flexibility because the cumulative registration could be requested by the user terminal or be implemented at the initiative of the network.

In the particular case where the registration request does not include any slice identifier, the network equipment delivers a registration decision comprising only the authorized or rejected slice parameters relating to a previous registration. For example, this allows avoiding interrupting an active packet data session on a slice that the user terminal has failed to identify again in the registration request.

Finally, according to another variant, the reply of the network equipment after a cumulative registration comprises a parameter, for example of the Boolean type, indicating that the cumulative registration results in the registration of all subscribed slices. In this case, instead of returning in the cumulative registration reply the exhaustive list of authorized slices corresponding to all subscribed slices, then the network returns only one parameter, for example denoted allRegistration, so as to reduce signaling.

The presence of such a parameter allRegistration in the reply of the network to a cumulative registration request enables the user terminal to know that all subscribed slices are authorized and that it could therefore make a packet data session activation request for any of these subscribed slices. To do so, the user terminal should interpret or decode this parameter received in the reply. Afterwards, according to a first implementation, a request for activation of a packet data session for this user terminal takes into account this registration indicator of all subscribed slices using an identifier amongst the identifiers of the subscribed slices. According to a second implementation, the user terminal could, after having decoded the parameter allRegistration, modify the content of the value Allowed NSSAI, stored locally, by putting therein the identifiers of all of the subscribed slices. Afterwards, upon a packet data session activation request, the user terminal uses this value to know which slice is authorized.

Description of the Second Embodiment

As indicated before, the second embodiment implements a global registration for all of the subscribed slices, autonomously by the network equipment embodiment, based on implementing this second information known to the network listing the subscribed slices associated with the subscription information of the user terminal at the origin of the registration request, and without taking into account information transmitted or not by the user terminal in the registration request concerning the slices to be registered.

The processing of the registration request by the network in this second embodiment is different from the standard because it concerns a global registration instead of an additional registration. It should also be noted that the request emitted by the user terminal may take on additional characteristics compared to the standard. Next, reference will be made to a first solution when the request is specific and therefore comprises a characteristic according to the invention, a second solution otherwise.

The first solution is now described, with reference to FIG. 4, according to which the registration request comprises an indication of the user terminal requesting a global registration. In this manner, to request a registration of all subscribed slices, the user terminal is not obliged to specify all of the identifiers of the subscribed slices in the registration request, as is the case according to current techniques, which considerably reduces the size of the registration request.

According to a first variant, this indication is in the form of a new specific parameter compared to the standard, the global registration indicator, added in the registration request. According to a second variant, this indication reuses a parameter already defined in the standard, by modifying a parameter composing it or by adding a new parameter. For example, the format of the NSSAI parameter (standing for Network Slice Selection Assistance Information, representing a set of slices) is augmented by an optional parameter, denoted allSnssaiRegistration, of the Boolean type indicating:

when it is equal to the value "1", the user terminal wishes to perform a global registration;

when it is equal to the value "0", the user terminal does not wish to perform a global registration.

The network equipment interprets or decodes, during a decoding sub-step, the global registration indicator (for example the above-described parameter allSnssaiRegistration) received in the registration request originating from the user terminal, so as to deliver a positive or negative global registration indication depending on the value of the indicator.

Afterwards, if the global registration indication is positive, i.e. the user terminal requires a global registration, then the network equipment implements a step 400 of autonomously determining a registration status (authorization/rejection/pending) for each of the slices of the network subscribed by the user identified in a network parameter comprising the identifiers of all the network slices subscribed by the user, delivering a registration decision. This autonomous determination step 400 is implemented without taking into account one or more possible slice identifier(s) included in the request.

For example, the network equipment knows the identifiers of the subscribed slices thanks to the subscription data of the user terminal obtained by interrogating another subscription data management equipment (for example the UDM entity, standing for Unified Data Management, according to the standard in force storing these subscription data itself or capable of obtaining them from one or more other entit(y/ies) such as the UDR, standing for Unified Data Repository ensuring storage thereof). This step 400 is described in detail hereinafter, in connection with the second solution.

On the other hand, if the global registration indication is negative, then the network equipment implements a "forced" global registration in the case where the registration request does not include any slice identifier. Otherwise, i.e. if at least one slice is identified in the registration request, the network equipment does not implement the registration according to the invention and could implement the steps of a classic, or standard, registration based solely on the determination of a registration status of the slice(s) identified in the request.

According to this first solution, the registration reply delivered by the network to the user terminal may also comprise a successful global registration indicator, for example the same parameter allSnssaiRegistration as that contained in the request. This reply parameter is optional, for example of the Boolean type, and indicates that all subscribed slices have been registered (i.e. that all subscribed slices have been authorized) when it is equal to the value "1". It is equal to the value "0", otherwise, i.e. when at least one subscribed slice has been rejected, and the reply of the network equipment is that described hereinafter in connection with the second solution, i.e. it comprises the identifiers of all subscribed slices "distributed" to the according authorized/rejected/unauthenticated (i.e. awaiting authentication) status, determined for each subscribed slice.

The presence of the parameter allSnssaiRegistration in the reply of the network to a global registration request enables the user terminal to know that all subscribed slices are authorized and that it can therefore make a packet data session activation request for any of these subscribed slices. To do so, the user terminal should also interpret or decode this parameter received in the reply.

Afterwards, according to a first implementation, a request for activation of a packet data session for this user terminal takes into account this global registration r received following a global registration request, using an identifier amongst the identifiers of the subscribed slices.

According to a second implementation, the user terminal may, after having decoded the parameter allSnssaiRegistration, modify the content of the Value Allowed NSSAI, stored locally, by putting therein the identifiers of all of the subscribed slices contained in the Parameter Configured NSSAI. Afterwards, upon a packet data session activation request, the user terminal uses this value to know which slice is authorized.

In essence, in the example illustrated in FIG. 4, the user terminal UE1 requests to register, globally, with the network, the user having subscribed beforehand to the slices SI1 to SI10. Upon reception 200 of this global registration request, and after having decoded the parameter "allSnssaiRegistration" present in the registration request, the network equipment NE1 obtains, during a step 300, autonomously and from a network parameter comprising the identifiers of all network slices subscribed by the user, the registration status of all the network slices subscribed by the user, i.e. the slices SI1 to SI10. In this case, in this example, the subscribed slices SI1, SI2, SI3, SI6, SI7 and SI9 are authorized and the subscribed slices SI4, SI5, SI8 and SI10 are rejected. Afterwards, the network equipment NE1 delivers a registration decision comprising the authorized slices SI1, SI2, SI3, SI6, SI7 and SI9 and the rejected slices SI4, SI5, SI8 and SI10. Hence, in response to its global registration request, the user terminal UE1 receives information that is more complete than according to the techniques of the prior art.

Thus, in this example like in the previous example relating to cumulative registration, cumulative registration is implemented upon explicit request from the user and is not implemented by default by the network entity.

According to another example, the network entity systematically implements a global registration as soon as it receives a registration request: the use of a parameter originating from the user terminal in its registration request is then not necessary and in any case would not be analyzed by the network equipment. The network entity systematically implements the global registration to replace the additional registration provided for in the standard.

According to another example, the network entity systematically implements global registration by choice according to the policy of the operator, which means that the network equipment would be capable of performing an additional registration according to the standard and a global registration according to the invention, and the operator could configure it to apply one rather than another according to its own policy (note that the configuration of the registration type is not restrictive and could cover additional registration, cumulative registration, global registration, inter alia).

According to a final example, the network entity conditionally implements the global registration by choice according to the policy of the operator, which means that the network equipment would be capable of performing an additional registration according to the standard and a global registration according to the invention but would implement cumulative registration when one or more condition(s) is/are met, for example only for an IoT terminal and/or a terminal accessing from a fixed access.

The second solution is now described, i.e. the global registration steps implemented by the network, different from those implemented by the standard in force for example.

To do so, the AMF access control equipment determines the authorized/rejected slices for all of the subscribed slices and registers all of the authorized subscribed slices, whether on its initiative or that of the user terminal via a global registration indicator, but always independently of the slices that might be requested by the user terminal in its registration request.

This determination of the authorized/rejected slices is carried out by the network entity alone or in cooperation with another network entity (typically AMF with NSSF) for all of the subscribed slices and no longer for the slices specifically identified in the registration request.

According to a particular situation, a subscribed slice identified in the subscription data may require a prior authentication step before being authorized. In this case, it appears neither in the list of authorized slices nor in those of rejected slices, but in another list, denoted for example Pending NSSAI.

Hence, the reply of the network equipment includes the result of this global registration, namely an Allowed NSSAI value comprising the identifiers of the subscribed and authorized slices, and/or a Rejected NSSAI value comprising the identifiers of the subscribed and rejected slices, and/or a Pending NSSAI value comprising the identifiers of the slices awaiting authentication before authorization, each of the identifiers of the subscribed slices being in either one of these three parameters.

Hence, this second embodiment allows limiting the number of registrations triggered by the user terminal, because, thanks to one single global registration, the authorized/rejected/awaiting authentication status is determined in one single registration for all of the subscribed slices. Hence, this makes multiple registrations unnecessary. Hence, this allows limiting the signaling load in the network.

In addition, when the global registration indicator is used in the request, the size of this request is considerably reduced, because it is no longer necessary to indicate one or more slice identifier(s).

In addition, this second embodiment also allows for great flexibility because the global registration can be requested by the user terminal or be implemented at the initiative of the network. In this case (second solution of the second embodiment), registration for all subscribed slices is guaranteed by default, without adding any specific parameter if this is configured by the operator. It should be noted that this in no way penalizes the terminal in the use of the services but on the contrary it gives it potential access to more registered slices and therefore more services than with the standard.

This second embodiment allows registering all slices in one single registration procedure, while limiting the size of the request messages and therefore the reply of the network in the case of the first solution.

Finally, like for the first embodiment, this second embodiment allows keeping packet data sessions active, even if the user terminal does not identify the concerned slices in a subsequent registration request, since the global registration cannot withdraw a slice that would have been authorized beforehand, for the same access type and the same registration area.

Description of the Prior Slice Control

The proposed technique allows further limiting signaling in the network, irrespective of the implemented embodiment, by avoiding unnecessary registration requests. To do so, a verification step is implemented, prior to the steps detailed hereinabove in connection with the first and second embodiments. This verification step may be implemented by the user terminal, according to a first variant, or by network equipment, according to variant, a second and allows transmitting/processing a registration request only if at least one slice concerned by a future registration has not already been authorized or rejected, for the same access type and the same registration area.

This verification step is implemented only when the upcoming registration is neither a first registration, nor a registration following a change in the registration area of the user terminal, nor a registration due to an expiration of a duration of a previous registration. In other words, the verification is implemented only for a registration request in the context of a slice change. According to a first variant, the user terminal verifies that the slice identifier(s) that it considers signaling in its upcoming registration request are not present in the locally stored parameters listing the authorized slices (Allowed NSSAI) and listing the rejected slices (Rejected NSSAI). If this verification is negative, the registration request is transmitted to the network, otherwise, it is modified so as not to contain slice identifiers authorized or rejected before. This implementation differs from current techniques based on the standard in force, according to which the user terminal should identify in every registration request the identifiers of the slices for which a packet data session is active, otherwise this session will be interrupted/disabled. Indeed, as described before, a cumulative registration or a global registration allows, according to all possible variants, avoiding interrupting a current data session.

According to a second variant, it is the network equipment which implements this verification step, upon reception of a registration request. Thus, if the network equipment receives a registration request comprising one or more slice(s), each having already been known to the network as an authorized slice or rejected slice, i.e. for example that the AMF access control equipment already has it in the context information associated with the user terminal (UE context), then it rejects the registration request. Indeed, this request is unnecessary because the user terminal has identified in its request only slices whose authorized/rejected status is already known to it.

Hence, this second variant assumes that the network equipment knows how to differentiate between this type of registration request related to a slice change and a registration request related to mobility for example. Thus, the network equipment should not implement this verification step, when the registration request contains a registration type parameter which, according to current specifications, may be:

an initial registration ("initial registration");
a registration after a movement of the user terminal ("mobility registration updating");
a periodic registration ("periodic registration updating");
an emergency registration ("emergency registration")
but the network equipment implements this verification step for a registration request related to a slice change specific to the present technique, this request being distinguished from the other types of registration requests with a new value for the registration type parameter, for example "registration updating for slice(s) change".

The present technique allows, according to its different embodiments and variants, optimizing the procedure for registering a user equipment (UE) in a network-sliced communication network, for example a 5G network and could be applied to any future generation of network-sliced networks. The different embodiments are based on an inventive concept based on a cumulative aspect of the determination of authorized/rejected slices and no longer on the determination of authorization or rejection of slices specifically identified in the registration request as is the case according to current techniques.

According to the first embodiment relating to a cumulative registration, an accumulation of slice registration statuses is implemented with regards to a possible previous registration, limiting the number of registrations triggered by the user terminal, and therefore the signaling load in the network, and avoiding an undesirable interruption of an active packet data session, even if, by error, the user terminal has not identified in the current registration request the slice identifier(s) for which a packet data session is in progress.

According to the second embodiment relating to a global registration, all subscribed slices can be registered with one single procedure, thereby giving the user terminal access to all subscribed services/all subscribed slices while limiting signaling s in the network (no need for several registration procedures for the same access type and the same location of the user terminal).

The invention claimed is:

1. A method comprising:
registering a user terminal with a network-sliced communication network, said user terminal being capable of transmitting and receiving data on the network, the user terminal comprising subscription data of a user for at least one of the slices of the network, the registering being implemented at least by network equipment capable of communicating with the user terminal via the network and comprising:
receiving a registration request emitted by the user terminal to register with the network;
obtaining, in context information associated with the user terminal, an authorization or a rejection of at least one of the slices of the network authorized or rejected previously during at least one previous registration of the user terminal for a same access type and a same registration area, delivering a registration decision, or
autonomously determining a registration status for each of the slices of the network subscribed by the user and identified by the network equipment in a network parameter comprising identifiers of all the network slices subscribed by the user, delivering a registration decision.

2. The method according to claim 1, where the registration decision comprises at least one authorized slice parameter comprising at least one identifier of one of the slices of the network authorized previously during at least one previous registration of the user terminal for the same access type and the same registration area and/or at least one rejected slice parameter comprising at least one identifier of one of the network slices rejected previously during at least one previous registration of the user terminal for the same access type and the same registration area.

3. The method according to claim 2, where the registration request comprises at least one identifier of a slice subscribed by the user and the obtaining comprises determining a registration status for said at least one slice identified in the request.

4. The method according to claim 3, where the identifier of the slice identified in the request is included, in the registration decision, in the authorized slice parameter or the rejected slice parameter or an unauthenticated slice parameter, depending on the determination of the registration status.

5. The method according to claim 1, where the registration request comprises at least one slice accumulation indicator and the obtaining comprises decoding said received at least one slice accumulation indicator delivering a positive or negative accumulation indication.

6. The method according to claim 5, where, in response to said accumulation indication being positive, the registration decision comprises at least one authorized slice parameter comprising at least one identifier of one of the network slices authorized previously during at least one previous registration of the user terminal for the same access type and the same registration area and/or at least one rejected slice parameter comprising at least one identifier of one of the network slices rejected previously during at least one previous registration of the user terminal for the same access type and the same registration area.

7. The method according to claim 6, where the registration request comprises at least one identifier of a slice subscribed by the user and the obtaining comprises determining a registration status for said at least one slice identified in the request, and where, in the registration decision, the identifier of the slice identified in the request is included in the authorized slice parameter or the rejected slice parameter or an unauthenticated slice parameter, depending on the determination of the registration status.

8. The method according to claim 1, where the autonomous determination does not take into account one or more slice identifier(s) included in the request.

9. The method according to claim 1, where the registration decision comprises at least one authorized slice parameter comprising the identifiers of all authorized subscribed slices and/or or at least one rejected slice parameter comprising the identifiers of all rejected subscribed slices and/or at least one unauthenticated slice parameter comprising the identifiers of all subscribed slices awaiting authentication.

10. The method according to claim 1, where the registration request comprises at least one global registration indicator triggering a step of decoding said at least one received global registration indicator delivering a positive or negative global registration indication.

11. The method according to claim 10, where, in response to said global registration indication being positive, triggering the determining of the registration decision, wherein the registration decision comprises at least one authorized slice parameter comprising the identifiers of all authorized subscribed slices and/or at least one rejected slice parameter comprising the identifiers of all rejected subscribed slices and/or at least one unauthenticated slice parameter authentication comprising the identifiers of all subscribed slices awaiting authentication.

12. The method according to claim 10, where, in response to said global registration indication being negative and the registration request comprising at least one identifier of a slice subscribed by the user, the determination of the registration decision is triggered only for the slice(s) identified in the request and the registration decision comprises at least one authorized slice parameter comprising at least one identifier of a slice identified in the request and authorized and/or at least one rejected slice parameter comprising at least one identifier of a slice identified in the request and rejected and/or at least one unauthenticated slice parameter comprising at least one identifier of a slice identified in the request and awaiting authentication.

13. The method according to claim 10, where, in response to said global registration indication being negative and the registration request not including an identifier of a slice subscribed by the user, the determination of the registration decision is triggered and the registration decision comprises at least one authorized slice parameter comprising the identifiers of all authorized subscribed slices and/or at least one rejected slice parameter comprising the identifiers of all rejected subscribed slices and/or at least one unauthenticated slice parameter comprising the identifiers of all subscribed slices awaiting authentication.

14. The method according to claim 1, wherein the registration decision comprises a successful global registration indicator when all subscribed slices are authorized.

15. The method according to claim 1, where the registration request comprises a slice change indicator and where the method comprises a prior step of verifying whether at least one subscribed slice has been authorized or rejected previously during at least one previous registration of the user terminal for the same access type and the same registration area.

16. The method according to claim 15, where the prior verification step is implemented by the user terminal and in response to the verification being positive, the registration request does not contain the identifier of the slice authorized or rejected previously.

17. The method according to claim 15, where the prior verification step is implemented by the network equipment for the slice identifiers included in the registration request and where, in response to the verification being positive for all of the slice identifiers included in the registration request, the obtaining is not implemented and the registration request is rejected.

18. The method according to claim 1, where the registration request comprises a slice change indicator and where the method comprises a prior verification step, implemented by the network equipment, in response to all subscribed slices having been authorized or rejected previously during at least one previous registration of the user terminal for the same access type and the same registration area and where, in response to the verification being positive, the obtaining or determining is not implemented and the registration request is rejected.

19. A device for registering a user terminal with a network-sliced communication network, said user terminal being capable of transmitting and receiving data on the network, the user terminal comprising subscription data of a user for at least one of the slices of the network, the device being implemented at least by network equipment capable of communicating with the user terminal via the network and comprising:

a receiver, a transmitter, a processor and a memory coupled to the processor with instructions which when executed by the processor configure the device to:

receive a registration request emitted by the user terminal to register with the network;

obtain, in context information associated with the user terminal, an authorization or a rejection of at least one of the slices of the network authorized or rejected previously during at least one previous registration of the user terminal for a same access type and a same registration area, delivering a registration decision, or autonomously determine a registration status for each of the slices of the network subscribed by the user and identified by the network equipment in a network parameter comprising identifiers of all the network slices subscribed by the user, delivering a registration decision.

20. A user terminal capable of transmitting and receiving data on a network-sliced communication network with which the user terminal is registered, the user terminal comprising:

subscription data of a user for at least one of the slices of the network, and a receiver, a transmitter, a processor and a memory coupled to the processor with instructions which when executed by the processor configure the user terminal to:

verify whether at least one subscribed slice has been authorized or rejected previously during at least one previous registration of the user terminal for a same access type and a same registration area and, in response to the verification being positive, emitting a registration request by the user terminal to register with the network in which the registration request does not contain an identifier of the slice authorized or rejected previously.

21. An A non-transitory computer readable information medium including instructions of a computer program stored thereon which when executed by a processor of a network equipment configure the network equipment to register a user terminal with a network-sliced communication network, said user terminal being capable of transmitting and receiving data on the network, the user terminal comprising subscription data of a user for at least one of the slices of the network, the network equipment capable of communicating with the user terminal via the network and the registering comprising:

receiving a registration request emitted by the user terminal to register with the network;

obtaining, in context information associated with the user terminal, an authorization or a rejection of at least one of the slices of the network authorized or rejected previously during at least one previous registration of the user terminal for a same access type and a same registration area, delivering a registration decision, or autonomously determining a registration status for each of the slices of the network subscribed by the user and identified by the network equipment in a network parameter comprising identifiers of all the network slices subscribed by the user, delivering a registration decision.

\* \* \* \* \*